US011360008B2

(12) United States Patent
Tsuji (10) Patent No.: US 11,360,008 B2
(45) Date of Patent: Jun. 14, 2022

(54) MEASUREMENT DEVICE AND MATERIAL TESTER

(71) Applicant: Shimadzu Corporation, Kyoto (JP)

(72) Inventor: Hiroshi Tsuji, Kyoto (JP)

(73) Assignee: Shimadzu Corporation, Kyoto (JP)

(*) Notice: Subject to any disclaimer, the term of this patent is extended or adjusted under 35 U.S.C. 154(b) by 1038 days.

(21) Appl. No.: 16/061,406

(22) PCT Filed: Mar. 16, 2016

(86) PCT No.: PCT/JP2016/058264
§ 371 (c)(1),
(2) Date: Jun. 12, 2018

(87) PCT Pub. No.: WO2017/158753
PCT Pub. Date: Sep. 21, 2017

(65) Prior Publication Data
US 2020/0264081 A1    Aug. 20, 2020

(51) Int. Cl.
*G01N 3/06*        (2006.01)
*G01N 3/08*        (2006.01)

(52) U.S. Cl.
CPC .............. *G01N 3/066* (2013.01); *G01N 3/08* (2013.01); *G01N 2203/0017* (2013.01)

(58) Field of Classification Search
CPC .. G01N 3/066; G01N 3/08; G01N 2203/0017; G01B 7/16; G01B 7/18; G01B 7/24; G01D 5/165; G01D 5/2266; G01D 3/028
See application file for complete search history.

(56) References Cited

U.S. PATENT DOCUMENTS

| 5,774,366 A * | 6/1998 | Beckwith | G01R 23/16 324/74 |
| 6,377,845 B1* | 4/2002 | Kinast | A61B 5/30 600/547 |

FOREIGN PATENT DOCUMENTS

| JP | 2005-195509 A | 7/2005 |
| JP | 2007-218809 A | 8/2007 |
| JP | 2008-076299 A | 4/2008 |

OTHER PUBLICATIONS

Jack Schaedler, "Circle Sines and Signals. Correlation and Contribution. Compound Waveforms and Their Constituents", 2015.*
Extended European Search Report dated Sep. 23, 2019, in connection with corresponding EP Application No. 16894371.0 (8 pgs).
(Continued)

*Primary Examiner* — Alexander Satanovsky
(74) *Attorney, Agent, or Firm* — Maier & Maier, PLLC (57) ABSTRACT

In an FPGA, waveform data to be sent from the FPGA to a DAC is stored, and a logical circuit is configured from a detection circuit for extracting test force value and elongation value signal components from a signal input from an ADC, an offset subtractor, and a gain multiplier. The detection circuit extracts a resistance component proportional to the test force and displacement. In the detection circuit, an expression that includes a harmonic component of an odd multiple of the carrier frequency is used as a correlation function for extracting the resistance component. As a result, it is possible to obtain calculation results at a sampling frequency that is higher than the carrier frequency.

5 Claims, 8 Drawing Sheets

(56) References Cited

OTHER PUBLICATIONS

Office Action dated Jan. 19, 2020, in corresponding Chinese Application No. 201680065251.5; 12 pages.
Lihua, "Weak Signal Detection Lecture Lecture 3 Correlation Detection and its Application in Lock-in Amplifier", vol. 17, No. 9, Sep. 1988, pp. 564-569, total 14 pages.
International Search Report and Written Opinion dated Jun. 14, 2016 and Response to the Written Opinion of corresponding International application No. PCT/JP2016/058264; 4 pgs.

* cited by examiner

MEASUREMENT DEVICE AND MATERIAL TESTER

FIELD

This invention relates to a measurement device and a material tester including a detector that converts physical quantity into an electric signal.

BACKGROUND

A plurality of detectors for converting physical quantity such as a force, a displacement, etc. into an electric signal such as a load mechanism for applying a test load to a test piece, a test force detector for measuring a test force applied to the test piece by the load mechanism, a displacement meter for detecting a displacement generated in the test piece, etc. are arranged in a material tester for executing material testing. A system for measuring physical quantity in material testing is configured by connecting these detectors to a tester controller that controls the entire material tester through an amplifier (see Patent Document 1).

This type of detector is excited by an alternating current (AC) voltage in many cases. In a receiving circuit that receives an electric signal output by a detector, only a measurement signal is extracted from a carrier wave (carrier) modulated according to physical quantity such as a force, a displacement, etc., thereby obtaining a signal according to a change in physical quantity. A detector circuit that receives an output signal of the detector and extracts a component of physical quantity is provided in a control device, etc. of the material tester. Further, the detector and the amplifier are connected by a multi-core shielding wire. Conventionally, it has been known that stray capacitances between core wires and between a core wire and a shield cause measurement error of the physical quantity, and Patent Document 2 proposes a carrier wave type strain measuring method that compensates for an influence due to an inter-cable stray capacitance.

Fourier transformation has been conventionally used as a method of exciting a detector with an AC voltage and extracting components of a force and a displacement from a received signal. When a resistance component proportional to the magnitude of a force or a displacement is set to A, and a capacitive component not proportional to the magnitude of a force or a displacement and generated by a capacitance parasitic in a circuit is set to B, a received signal f(t) is expressed by Expression (1).

[Formula 2]

$$f(t) = A \sin \omega t + B \cos \omega t \qquad (1)$$

Note that $\omega$ denotes an angular frequency of a carrier signal, and a phase difference with respect to a reference signal is set to zero for simplification of the expression. In general, the Fourier transform F(f) of f(t) is expressed by the following Expression (2).

[Formula 3]

$$F(\omega) = \int_{-\infty}^{\infty} f(t) e^{-j\omega t} dt \qquad (2)$$

A domain of Expression (2) is $-\infty$ to $+\infty$. However, in a circuit on the amplifier side that receives an output signal of the detector, convolution integration with a correlation function is performed every one carrier period to shorten a measurement interval, and the resistance component A is extracted. That is, only a component whose phase coincides with that of sin $\omega t$ of Expression (1) is obtained for one period. In this instance, the Fourier transform $F_s(\omega)$ is expressed by the following Expression (3).

[Formula 4]

$$F_s(\omega) = \int_0^{\frac{2\pi}{\omega}} f(t) e^{-j\omega t} dt \qquad (3)$$

Since the resistance component A is set to sin $\omega t$ in Expression (1), a value to be obtained corresponds to an imaginary part of Expression (3).

[Formula 5]

$$\begin{aligned}
\operatorname{Im}[F_s(\omega)] &= -\int_0^{\frac{2\pi}{\omega}} f(t) \sin \omega t \, dt \qquad (4)\\
&= -\int_0^{\frac{2\pi}{\omega}} (A \sin \omega t + B \cos \omega t) \sin \omega t \, dt \\
&= -A \int_0^{\frac{2\pi}{\omega}} (\sin \omega t)^2 dt - B \int_0^{\frac{2\pi}{\omega}} \cos \omega t \sin \omega t \, dt \\
&= \frac{A}{2} \int_0^{\frac{2\pi}{\omega}} (\cos 2\omega t - 1) dt - \frac{B}{2} \int_0^{\frac{2\pi}{\omega}} \sin 2\omega t \, dt \\
&= \frac{A}{2} \left[ \frac{\sin \omega t}{2\omega} - t \right]_0^{\frac{2\pi}{\omega}} + \frac{B}{2} \left[ \frac{\cos \omega t}{2\omega} - t \right]_0^{\frac{2\pi}{\omega}} \\
&= -\frac{\pi A}{\omega}
\end{aligned}$$

According to Expression (4), the capacitive component B is eliminated, and only the resistance component A may be extracted. That is, the resistance component A may be extracted by the following Expression (5).

[Formula 6]

$$A = -\frac{\omega}{\pi} \operatorname{Im}[F_s(\omega)] = -\frac{\omega}{\pi} \int_0^{\frac{2\pi}{\omega}} f(t) \sin \omega t \, dt \qquad (5)$$

CITATION LIST

Patent Document

Patent Document 1: JP-A-2007-218809
Patent Document 2: JP-A-2005-195509

SUMMARY OF THE DISCLOSURE

Conventionally, the resistance component A has been obtained by using Expression (5) on the assumption that a frequency component of the resistance component A is sufficiently small with respect to the carrier frequency. For this reason, when the sampling frequency required in material testing increases, and it is intended to detect a higher frequency component, it is necessary to increase a frequency of a driving wave of the detector, that is, the carrier frequency. Meanwhile, examples of the detector include a detector in which a frequency range of the driving wave is determined from the viewpoint of measurement accuracy depending on the measurement scheme such as a differential transformer type detector, and there is a problem that the carrier frequency may not be increased beyond the frequency range. In addition, when the carrier frequency is increased, there is a problem that an influence of a stray capacitance between cables increases and reliability of a measured value decreases.

The invention has been made to solve the above-mentioned problems, and an object of the invention is to provide a measurement device and a material tester capable of extracting a frequency component exceeding a carrier frequency which is a drive signal of a detector and capable of more specifically capturing a change in physical quantity detected by the detector.

Solution to Problem

The invention is a measurement device for measuring a change in physical quantity generated in an object to be measured, including a detector that converts the change in physical quantity generated in the object to be measured into an electric signal and outputs the converted electric signal, and a sensor amplifier that applies a sinusoidal wave having a predetermined period for driving the detector to the detector and receives a signal output from the detector, in which the sensor amplifier has a receiving circuit that extracts a component of a physical quantity measured by the detector from a received signal input from the detector to the sensor amplifier, and the receiving circuit uses a function including a component in synchronization with the sinusoidal wave having the predetermined period and an odd harmonic component thereof as a correlation function for extracting a resistance component converted from the physical quantity from the received signal.

The invention is the measurement device, in which the receiving circuit extracts a resistance component As by an expression below using a function including a component in synchronization with the sinusoidal wave having the predetermined period and an odd harmonic component thereof when g(t) is set to a received signal, and Gs(ω) is set to a Fourier transform of one period in a period of a carrier wave of g(t):

[Formula 7]

$$A_s = -\frac{\omega}{\pi}\text{Im}[G_s(\omega)] = -\frac{\omega}{\pi}\sum_{k=0}^{n-1}\int_0^{\frac{2\pi}{\omega}} g(t)\sin(2k+1)\omega t\, dt.$$

The invention is a material tester for executing material testing, including a load mechanism that applies a test force to a test piece, in which the material tester includes the measurement device.

The invention is the material tester, in which the measurement device is a measurement device including a load cell as a detector that detects a test force applied to the test piece or a measurement device including a displacement meter as a detector that detects a displacement generated in the test piece.

Advantageous Effects of the Invention

In a receiving circuit that receives a signal from a detector, it is possible to extract a frequency component exceeding a carrier frequency which is a drive signal of the detector and more specifically capture a change in physical quantity detected by the detector using a function including a component in synchronization with a sinusoidal wave of a predetermined period and an odd harmonic component thereof as a correlation function for extracting a resistance component converted from the physical quantity from a received signal. In addition, since a carrier frequency may not be increased even when a sampling frequency required for measurement of a physical quantity increases, an influence on a measured value of a stray capacitance between cables does not increase, and reliability of a measured value is not impaired.

According to the invention, since data can be acquired at a frequency exceeding the carrier frequency, it is unnecessary to raise the carrier frequency of the detector even when the sampling frequency required for material testing increases.

According to the invention, an operation of the load mechanism can be performed more smoothly than in the past by executing automatic control such as feedback control based on data of a physical quantity measured by the measurement device.

According to the invention, since test data can be acquired at a sampling frequency required for material testing, it is possible to improve accuracy of a measured value of a test force by a load cell and a measured value of elongation by a displacement meter in material testing, and to smoothly perform automatic control of an operation of the material tester according to test force control or displacement control.

DETAILED DESCRIPTION OF THE DRAWINGS

Figure 1:
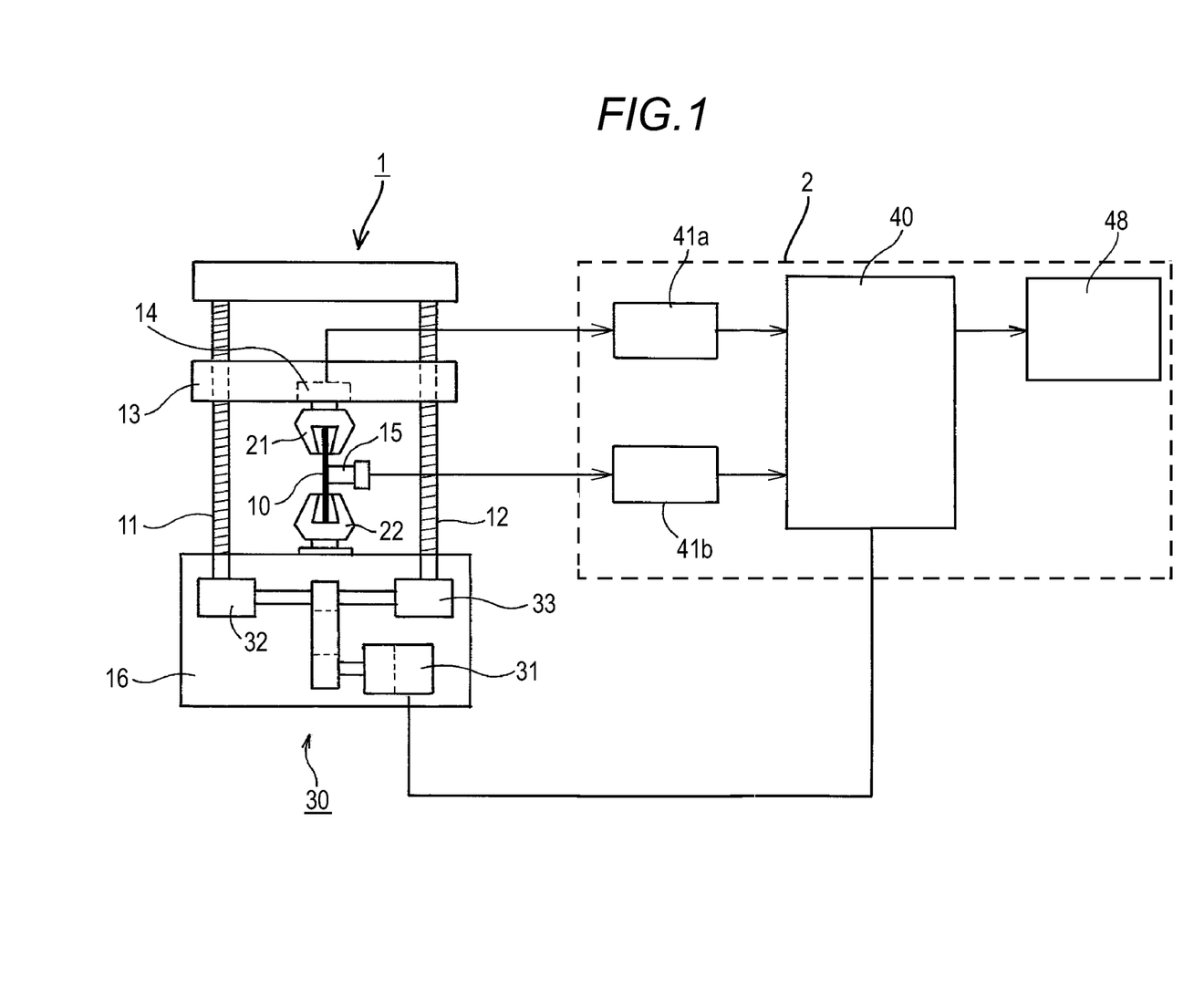
FIG. 1 is a schematic diagram of a material tester.

Hereinafter, an embodiment of the invention will be described based on drawings. FIG. 1 is a schematic diagram of a material tester.

This material tester includes a tester body 1 and a control device 2. The tester body 1 includes a table 16, a pair of screw rods 11 and 12 rotatably and vertically arranged on the table 16 in a vertically oriented state, a crosshead 13 movable along these screw rods 11 and 12, a load mechanism 30 for moving the crosshead 13 to apply a load to a test piece 10, a load cell 14 serving as a detector that converts a change in physical quantity in the test piece 10 corresponding to an object to be measured into an electric signal, and a displacement meter 15.

The crosshead 13 is connected to the pair of screw rods 11 and 12 through a nut (ball nut) (not illustrated). Worm reducers 32 and 33 in the load mechanism 30 are connected to lower end portions of the respective screw rods 11 and 12. The worm reducers 32 and 33 are connected to a servomotor 31 which is a drive source of the load mechanism 30, and rotation of the servomotor 31 is transmitted to the pair of screw rods 11 and 12 via the worm reducers 32 and 33. When the pair of screw rods 11 and 12 synchronously rotates due to rotation of the servomotor 31, the crosshead 13 is lifted and lowered along these screw rods 11 and 12.

An upper gripper 21 for gripping an upper end portion of the test piece 10 is attached to the crosshead 13. Meanwhile, a lower gripper 22 for gripping a lower end portion of the test piece 10 is attached to the table 16. In the case of performing a tensile test, a test force (tensile test force) is applied to the test piece 10 by lifting the crosshead 13 while both end portions of the test piece 10 are gripped by the upper gripper 21 and the lower gripper 22.

The control device 2 includes a computer, a sequencer, and peripheral devices thereof, has a central processing unit (CPU) that executes a logical operation, a read only memory (ROM) that stores an operation program necessary for control of the device, a random access memory (RAM) in which data, etc. is temporarily stored during controlling, etc., and includes a control panel 40 for controlling the entire device. Further, the control device 2 includes a load amplifier 41a serving as a sensor amplifier for the load cell, a strain amplifier 41b serving as a sensor amplifier for the displacement meter 15, and a display unit 48 for displaying a displacement amount or a test force detected by the load cell 14 and the displacement meter 15.

When the load mechanism 30 is operated, a test force acting on the test piece 10 gripped at both ends by the upper gripper 21 and the lower gripper 22 is detected by the load cell 14 and input to the control panel 40 through the load amplifier 41a. In addition, a displacement amount generated in the test piece 10 is measured by the displacement meter 15 and input to the control panel 40 through the strain amplifier 41b.

In the control panel 40, test force data and displacement amount data are fetched from the load cell 14 and displacement meter 15, and data processing is executed by the CPU. Further, in the control panel 40, rotational driving of the servomotor 31 is feedback-controlled using a variation of the test force and the displacement amount input as digital data by an operation of a control program stored in a digital circuit or the ROM.

Figure 2:
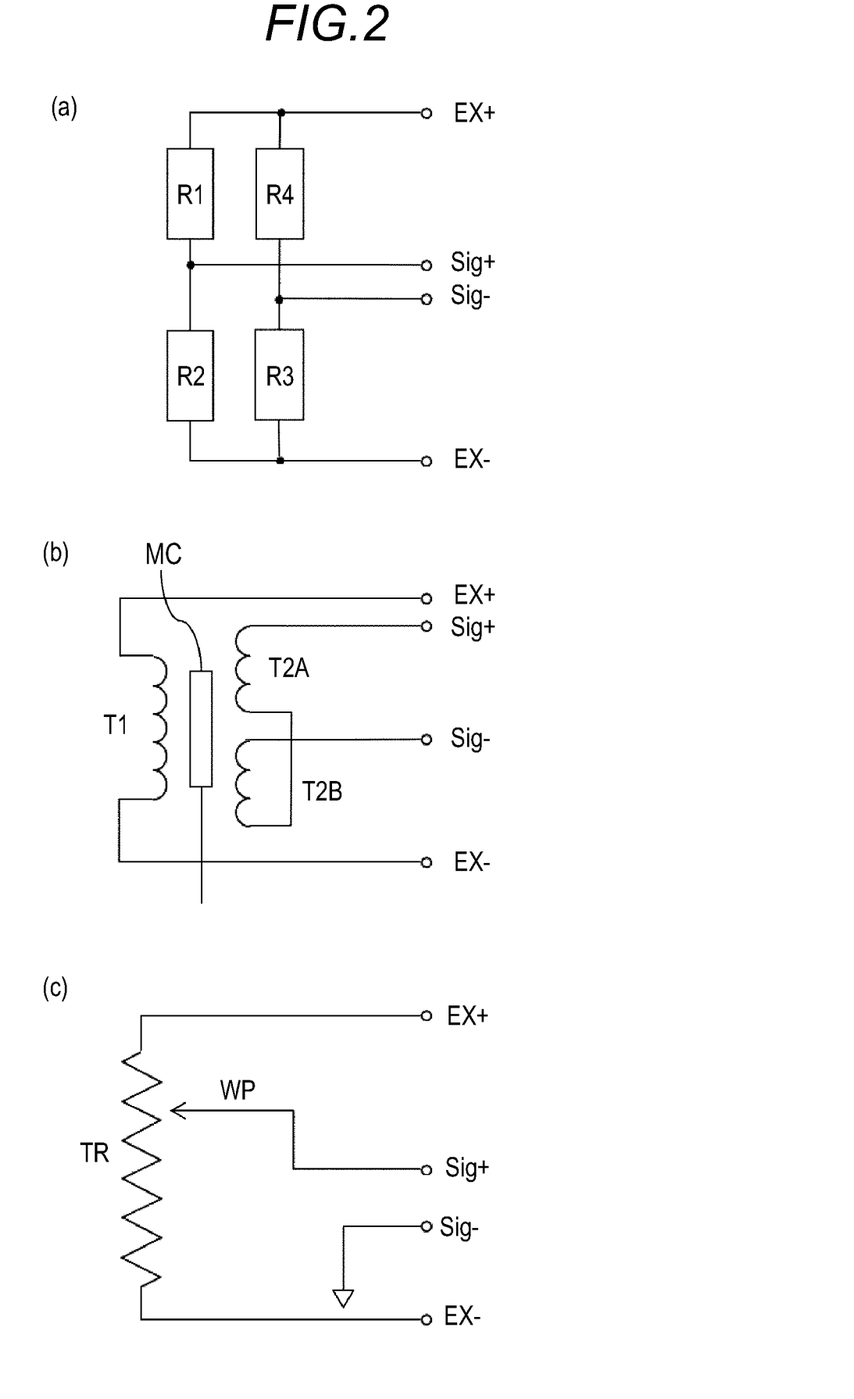
FIG. 2 is a schematic diagram for description of a structure of each detector.
Figure 3:
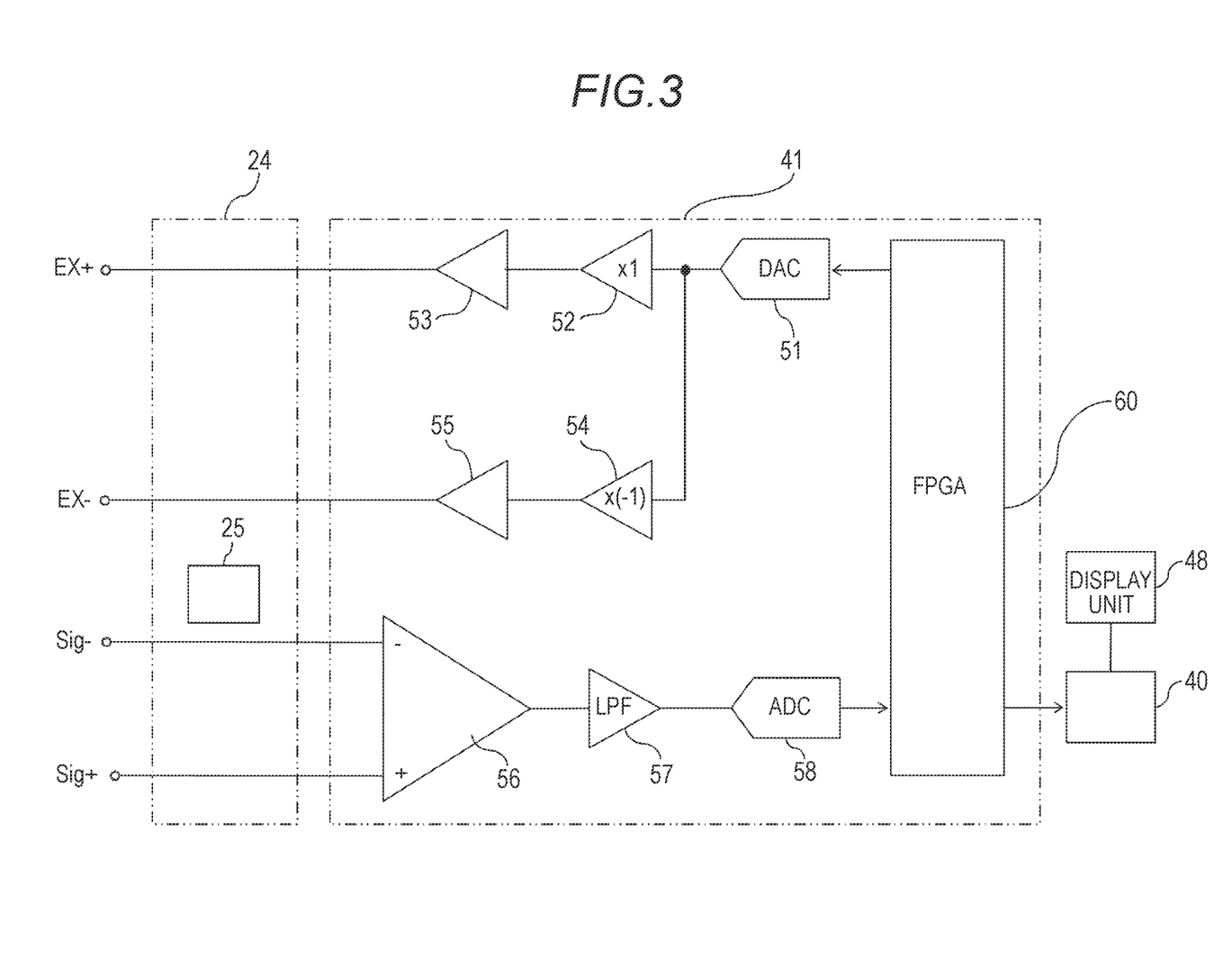
FIG. 3 is a schematic configuration diagram illustrating a configuration of a measuring circuit.
Figure 4:
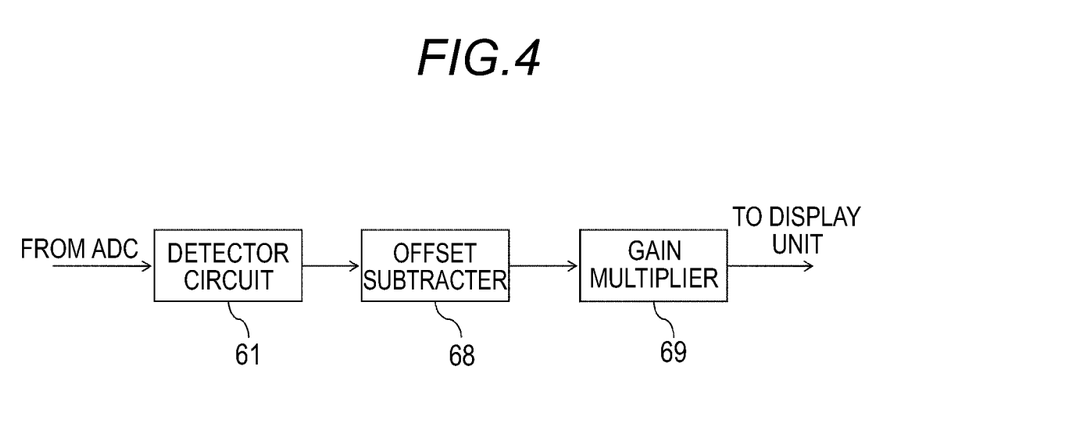
FIG. 4 is a block diagram for description of a functional configuration of a field programmable gate array (FPGA) 60.

FIG. 2 is a schematic diagram for description of a structure of each detector. FIG. 3 is a schematic configuration diagram of a measuring circuit. FIG. 4 is a block diagram for description of a functional configuration of an FPGA 60. The measuring circuit illustrated in FIG. 3 is the same for all the detectors illustrated in FIG. 2, and thus is described as a configuration of a measuring circuit of a measurement device. Further, the load amplifier 41a and the strain amplifier 41b are referred to as a sensor amplifier 41 below.

The material tester illustrated in FIG. 1 includes the load cell 14 and the displacement meter 15. The load cell 14 is a strain gauge type detector that measures a test force using a change in electrical resistance of a strain gauge, and includes a bridge circuit in which strain gauges R1 to R4 having the same resistance value are connected as illustrated in FIG. 2(a).

The displacement meter 15 includes a strain gauge type displacement meter, a differential transformer type displacement meter, and a potentiometer type displacement meter depending on the difference in measurement method, and the displacement meters are selected according to content of the test. Similarly to the load cell 14, the strain gauge type displacement meter includes the bridge circuit illustrated in FIG. 2(a). As illustrated in FIG. 2(b), the differential transformer type displacement meter is a detector that includes a primary coil T1, secondary coils T2A and T2B, and an iron core MC moving in conjunction with elongation of the test piece 10 and obtains a voltage output corresponding to a displacement using the fact that a difference depending on the position of the iron core MC is generated between induced voltages of the secondary coil T2A and the secondary coil T2B generated when the primary coil T1 is excited. In addition, as illustrated in FIG. 2(c), the potentiometer type displacement meter is a detector that includes a resistor TR and a wiper WP and converts a relative displacement amount of the resistor TR and the wiper WP into a voltage output. Sig– of the potentiometer type displacement meter is connected to a signal ground. Each of input terminals EX+ and EX– and output terminals Sig+ and Sig– of each detector illustrated in FIG. 2 is connected to a corresponding connection end of a cable unit 24.

The sensor amplifier 41 includes an analog circuit having an instrumentation amplifier 56, a low pass filter (LPF) 57, an analog-digital converter (ADC) 58, a digital-analog converter (DAC) 51, operational amplifiers 52 and 54, and power amplifiers 53 and 55 and a digital circuit having the FPGA 60. A detector circuit 61 that stores waveform data sent from the FPGA 60 to the DAC 51 and extracts a signal component of a test force value or an elongation value from a signal input from the ADC 58, an offset subtracter 68, and a gain multiplier 69 are constructed as a logic circuit in the FPGA 60. The detector circuit 61 extracts a resistance component proportional to the test force and the displacement using Expression (8) described below. The offset subtracter 68 subtracts an offset value indicating a steady state at the time of starting of the test of the test force value or the elongation value from digital data passing through the detector circuit 61. The gain multiplier 69 adjusts a gain difference according to the detector. In this embodiment, the FPGA is used as an element for realizing a logic circuit for processing a digital signal. However, it is possible to use a programmable logic device (PLD) capable of rewriting an internal circuit or a microcomputer that performs a digital signal by software. In addition, in this embodiment, the receiving circuit includes an analog circuit up to the instrumentation amplifier 56, the LPF 57, and the ADC 58 and a digital circuit of the detector circuit 61, the offset subtracter 68, and the gain multiplier 69 of the FPGA 60.

The detector and the sensor amplifier 41 are connected by the cable unit 24. The cable unit 24 includes a nonvolatile memory 25 that stores information about a type of each detector and information related thereto (type, full scale, etc.).

A waveform signal of a drive voltage input to the input terminals EX+ and EX– of each detector is transmitted from the FPGA 60 to the DAC 51. A waveform generated from the DAC 51 is input to the operational amplifiers 52 and 54, regarded as a drive waveform of plus or minus with zero volt as a center, and then amplified by the power amplifiers 53 and 55, and supplied as an excitation signal to the detector.

Signals output from the output terminals Sig+ and Sig− of the detector are input to the instrumentation amplifier 56, and a difference is extracted. Then, a component exceeding the Nyquist frequency of the ADC 58 is removed by the LPF 57, and then converted into a digital signal by the ADC 58, and input to the FPGA 60. Then, after signal processing in the FPGA 60, the test force value or the elongation value (displacement amount) of the test piece 10 is displayed on the display unit 48 through the control panel 40.

A further description will be given of signal processing in the detector circuit 61 of the FPGA 60 in the measurement device having the above configuration. Fourier transform is used to drive the detector using a sinusoidal wave having a predetermined period and extract a component of a force or a displacement from a received signal. In the invention, unlike the past, a received signal g(t) is expressed by Expression (6) below, and Fourier transform $G_s(\omega)$ thereof is defined as Expression (7). Further, a resistance component $A_s$ proportional to the magnitude of the test force applied to the test piece 10 or the displacement generated in the test piece 10 is extracted using Expression (8) derived by the convolution integral with the correlation function.

A signal for driving the detector is a sinusoidal wave of a single frequency. However, a signal output from the detector is a signal obtained by amplitude-modulating a drive signal according to a state change (here, regarded as a displacement) of the detector. Therefore, the signal output from the detector includes a frequency of a displacement other than a frequency of the drive signal.

[Formula 8]

$$g(t) = A(t)\sin \omega t + B \cos \omega t \qquad (6)$$

[Formula 9]

$$G_s(\omega) = \sum_{k=0}^{n-1} \int_0^{\frac{2\pi}{\omega}} g(t) e^{-j(2k+1)\omega t} \, dt \qquad (7)$$

[Formula 10]

$$A_s = -\frac{\omega}{\pi}\mathrm{Im}[G_s(\omega)] = -\frac{\omega}{\pi}\sum_{k=0}^{n-1}\int_0^{\frac{2\pi}{\omega}} g(t)\sin(2k+1)\omega t \, dt \qquad (8)$$

In addition, in the above Expressions, the resistance component A is set to A(t) which is written as a function of time for the following reason. The resistance component A refers to a component whose phase difference with respect to the drive signal to the detector is zero, and the magnitude at which this value varies with time may not be ignored. However, in calculation means of the invention, $A_s$ may not fully reproduce g(t), and thus $A_s$ is not a function of g(t) or t.

In Expression (6), A(t) is a resistance component and B is a capacitance component. In addition, 2k+1 in Expression (7) and Expression (8) is a degree of a harmonic.

Figure 5:
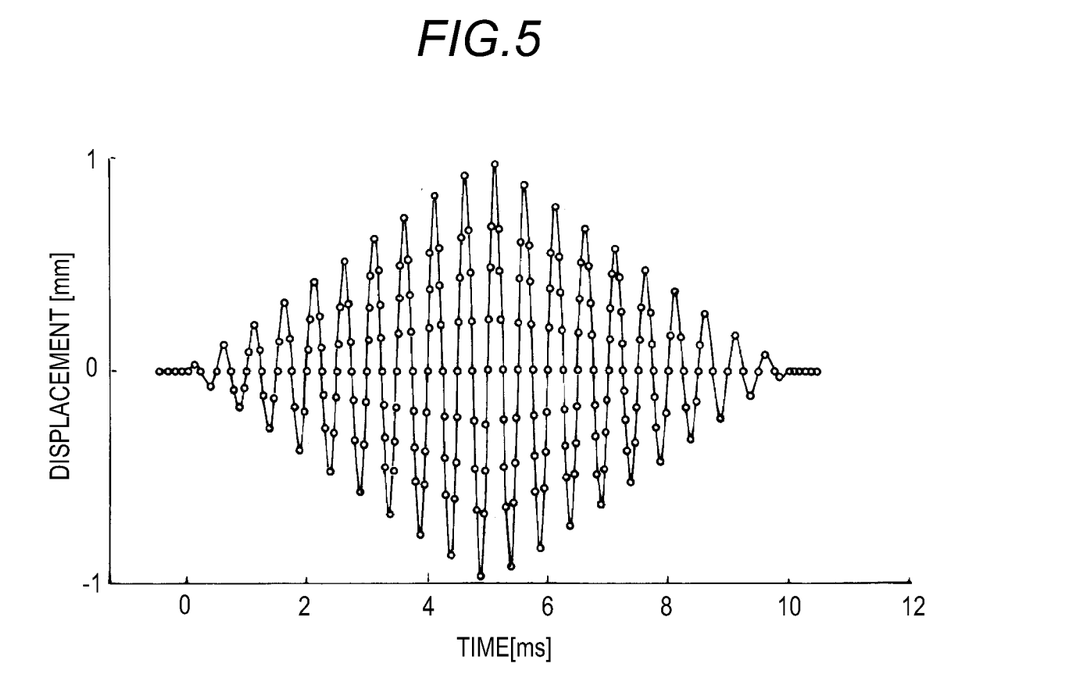
FIG. 5 is a graph showing a received signal.
Figure 6:
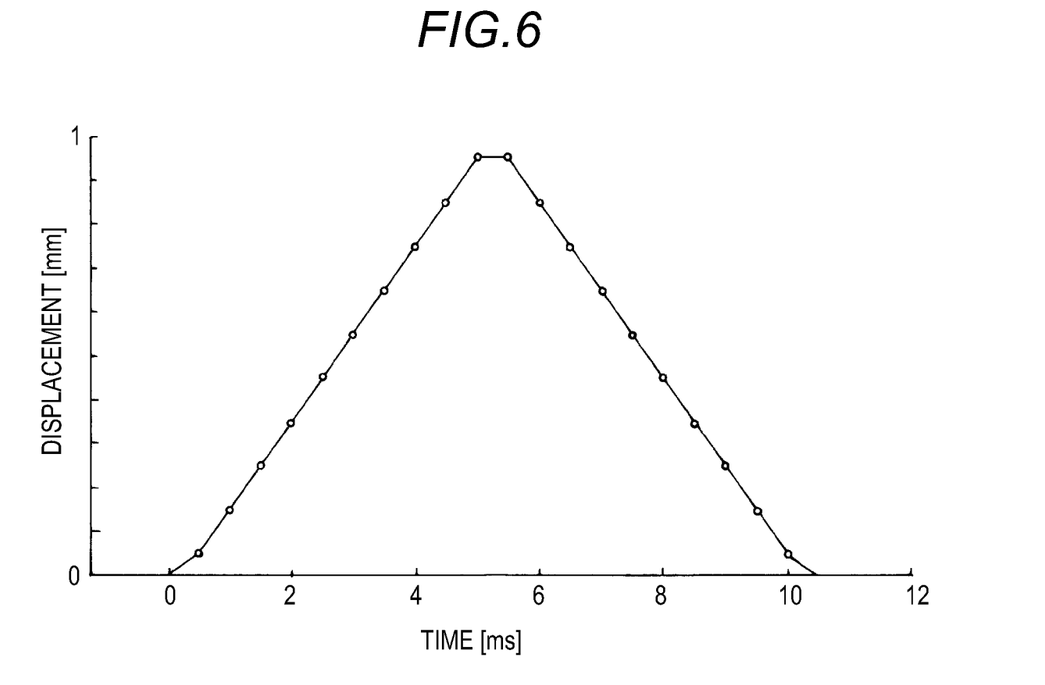
FIG. 6 is a graph showing a calculation result obtained by signal processing using conventional Expression (5).
Figure 7:
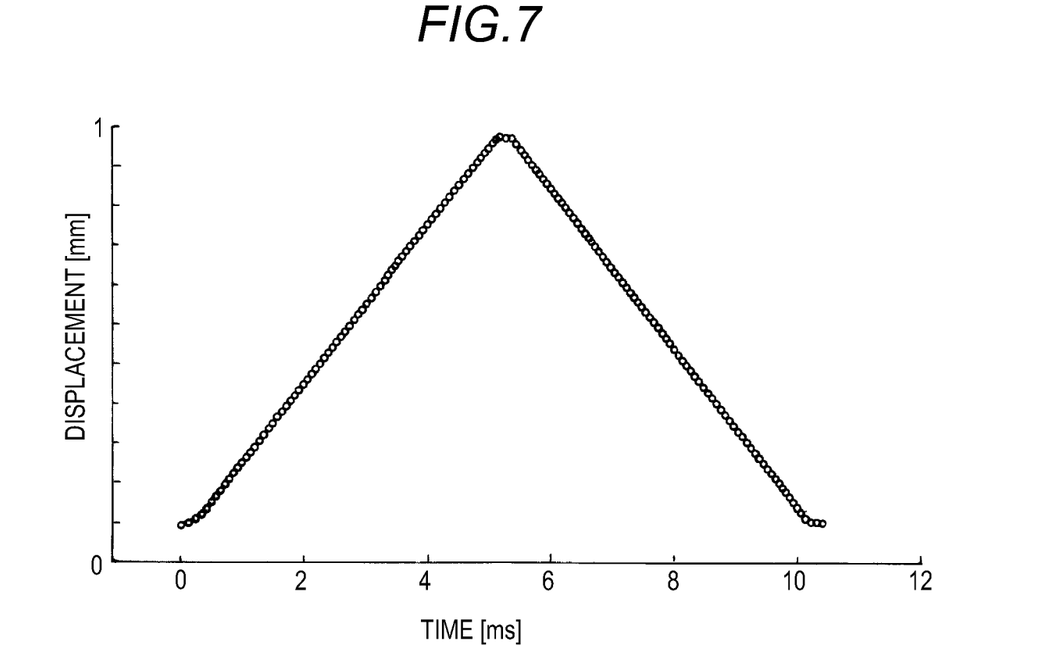
FIG. 7 is a graph showing a calculation result of Expression (8).

A case in which the differential transformer type displacement meter as a detector is driven at a carrier frequency of 2 kHz will be described by comparing results of simulation of a conventional signal processing scheme and a signal processing scheme of the invention based on the above Expression (8). FIGS. 5 to 7 illustrate waveforms when amplitude modulation is performed with triangular waves. FIG. 5 is a graph showing a received signal, and FIG. 6 is a graph showing a calculation result obtained by signal processing using the conventional Expression (5). In addition, FIG. 7 is a graph showing a calculation result of Expression (8). In these figures, a vertical axis of the graph indicates a displacement (mm: millimeter), a horizontal axis of the graph indicates time (ms: millisecond), and measurement points are indicated by white circles.

The received signal of FIG. 5 assumes a waveform when the iron core MC of the differential transformer displacement meter moves from 0 to 1 mm (millimeter) within a certain time (10 msec) and returns to a position of 0 again. When an assumed waveform of FIG. 6 is set to the received signal f(t) in the conventional Expression (1), calculation of the resistance component A obtained by the conventional Expression (5) uses the conventional Expression (3), and thus is performed only once for each cycle of the carrier frequency. For this reason, when the carrier frequency is 2 kHz, calculation is performed only every 500 microseconds even when a sampling frequency is 100 kHz. Therefore, according to the conventional signal processing scheme, as shown in FIG. 6, the measurement points of the displacement become sparse.

Meanwhile, in a case in which the assumed waveform of FIG. 5 is set to the received signal g(t) in Expression (6), the carrier frequency is 2 kHz, and the sampling frequency is 100 kHz, when calculations according to Expression (7) and Expression (8) are performed, a calculation result is obtained every sampling period (10 microseconds). That is, 50 times the measurement point can be obtained when compared to the past. Therefore, as shown in FIG. 7, a graph showing a change in displacement at a certain time is a smooth graph in which the measurement points are continuous. In the graph of FIG. 7, n=5 in Expression (8), and harmonics up to nine times the carrier frequency are calculated.

Figure 8:
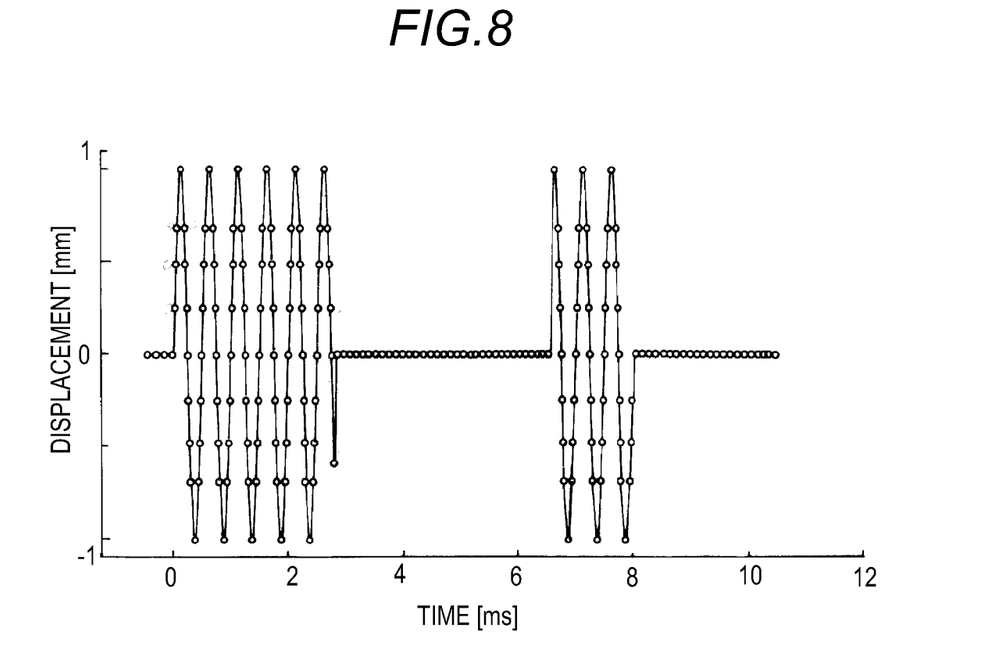
FIG. 8 is a graph showing a received signal.
Figure 9:
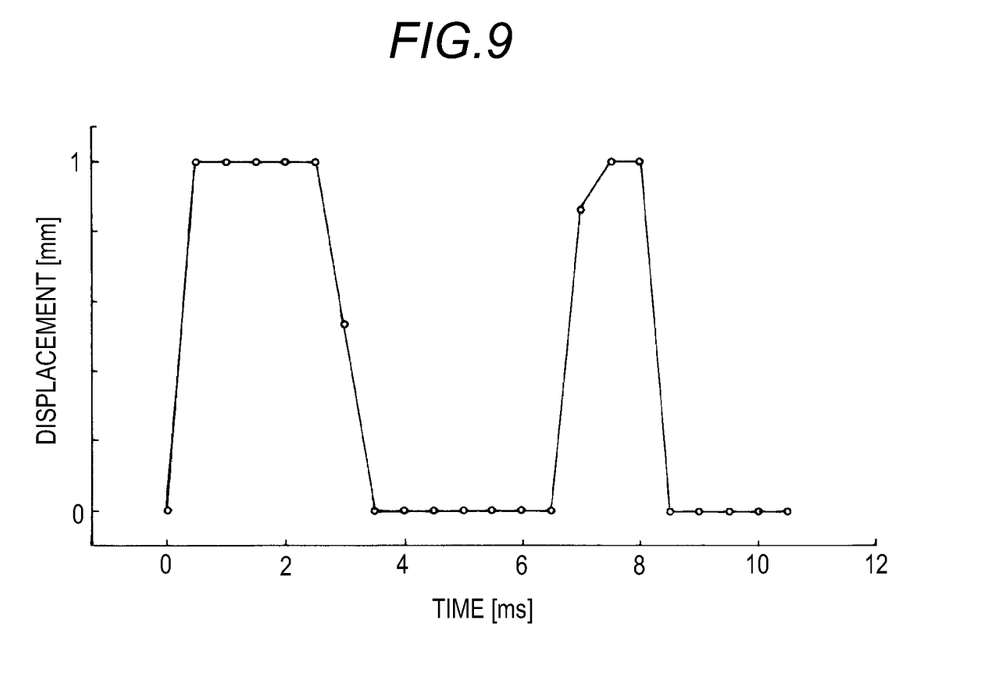
FIG. 9 is a graph showing a calculation result obtained by signal processing using conventional Expression (5).
Figure 10:
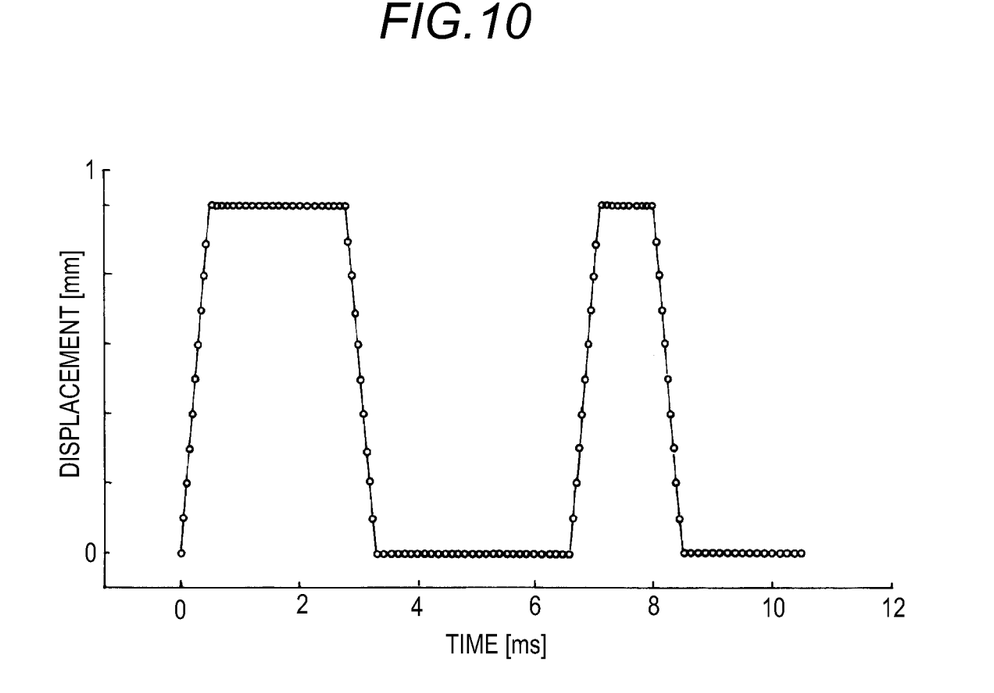
FIG. 10 is a graph showing a calculation result of Expression (8).

Each of FIG. 8 to FIG. 10 shows a waveform when amplitude is modulated by a rectangular wave. FIG. 8 is a graph showing a received signal, and FIG. 9 is a graph showing a calculation result obtained by signal processing using the conventional Expression (5). In addition, FIG. 10 is a graph showing a calculation result of Expression (8). In these figures, a vertical axis of the graph indicates a displacement (mm), a horizontal axis of the graph indicates time (ms), and measurement points are indicated by white circles.

As in the case in which amplitude modulation is performed with triangular waves, when the assumed waveform of FIG. 8 is calculated using the conventional signal processing scheme, the resistance component A is calculated once for each cycle of the carrier frequency, and thus the measurement points of the displacement become sparse as shown in FIG. 9.

Meanwhile, when calculations of Expression (7) and Expression (8) are performed with regard to the assumed waveform of FIG. 8, the resistance component As is calculated for each sampling period. Therefore, as shown in FIG. 10, it is possible to obtain a large number of measurement points of the displacement, which results in a smooth measurement result.

A measurement result shown in the graphs of FIG. 7 and FIG. 10 becomes smoother as the number of n is increased (a degree is increased) in Expression (8). The number (or degree) of n is appropriately selected according to a relationship between the sampling frequency and the carrier frequency and a range in which a correlation function used for numerical integration can reproduce a harmonic component. For example, when the sampling frequency is 100 kHz, and the carrier frequency is 2 kHz, both frequencies have a 50-fold difference in frequency. In this case, a harmonic with which the correlation function used for numerical integration can be reproduced is a 9-fold odd harmonic, and n=5 is the number of n preferred in Expression (8).

Figure 11:
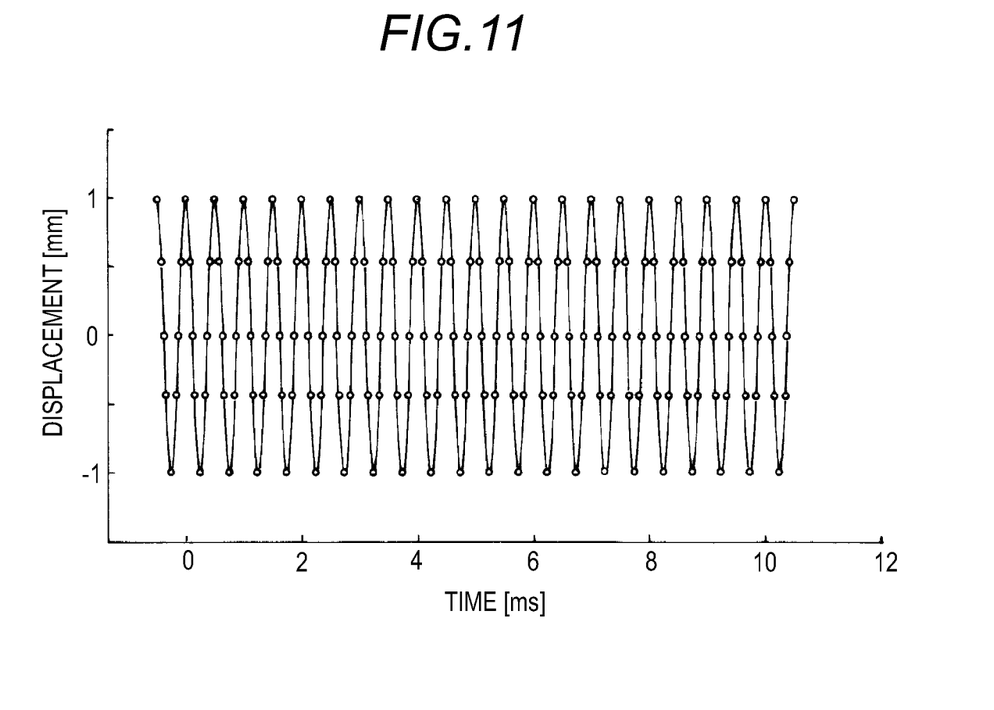
FIG. 11 is a graph showing a capacitive component.
Figure 12:
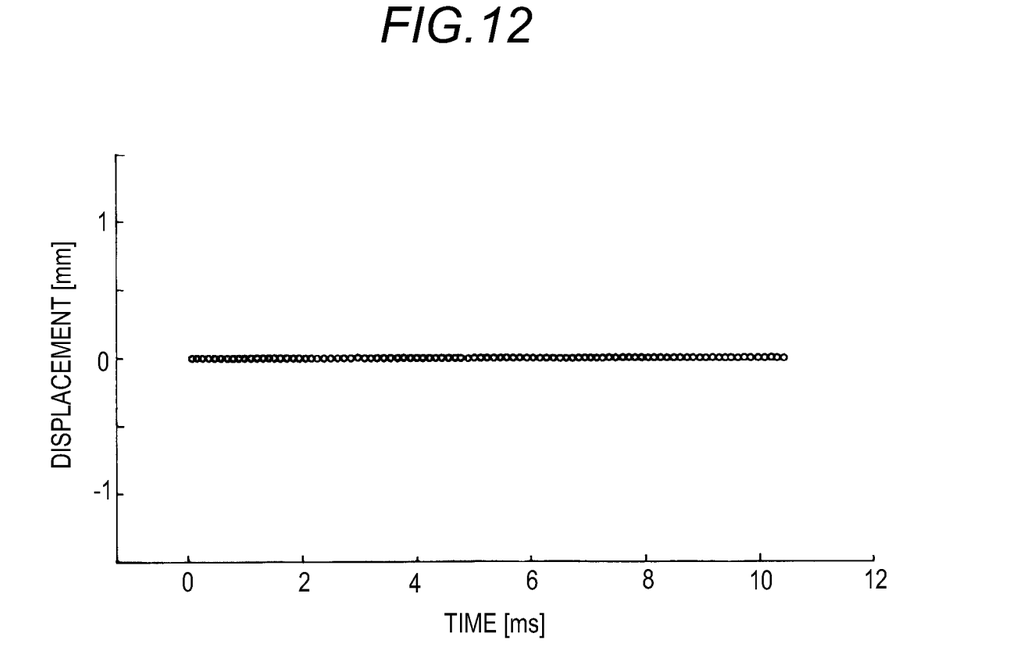
FIG. 12 is a graph showing a calculation result of Expression (8).

Next, the capacitive component will be considered. FIG. 11 is a graph showing a capacitive component. FIG. 12 is a calculation result of Expression (8). In these figures, a vertical axis of the graph indicates a displacement (mm), a horizontal axis of the graph indicates time (ms), and measurement points are indicated by white circles.

Since the capacitive component is a component parasitic in the circuit without being proportional to the displacement, the received signal has a waveform shown in FIG. 11. When the received signal A(t)=0 and the capacitive component B=1 in Expression (6), a calculation result of Expression (8) for the capacitance component B becomes As=0. For this reason, as shown in FIG. 12, the capacitive component B which does not change with time is deleted during calculation.

Figure 13:
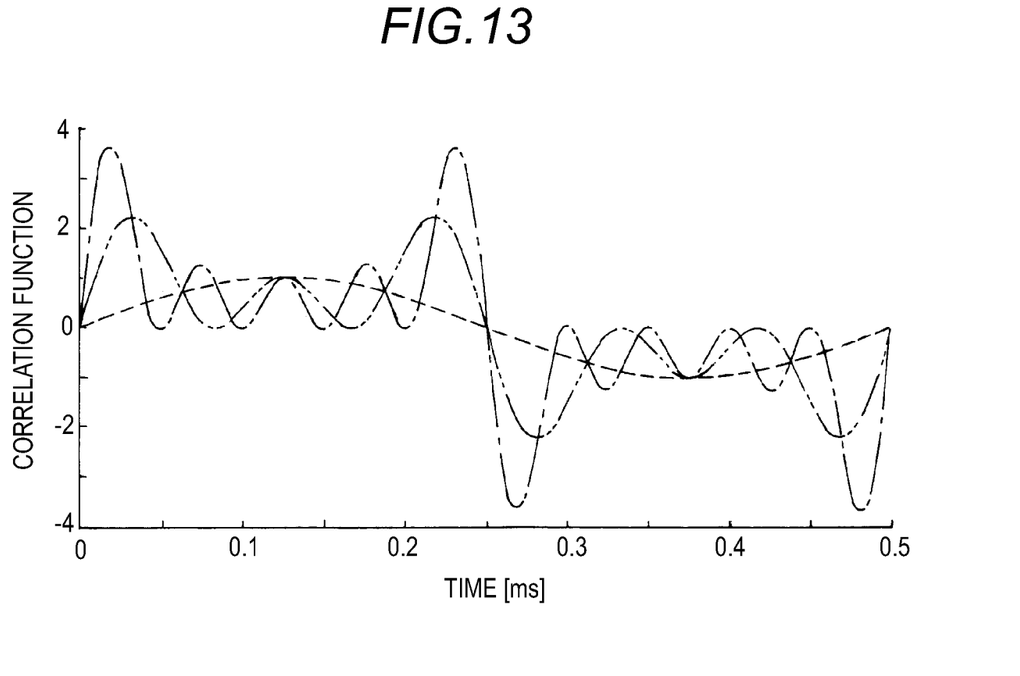
FIG. 13 is a graph showing a correlation function used for Expression (8).

FIG. 13 is a graph showing a correlation function used in Expression (8). In this figure, a vertical axis of the graph corresponds to a correlation function, and a horizontal axis of the graph corresponds to time (ms). In FIG. 13, for convenience of description, correlation functions in the case in which n in Expression (8) is 1, 3, and 5 are indicated by different line types. In this figure, a broken line indicates a case in which n=1, 2, a dotted chain line indicates a case in which n=3, and an alternated long and short dash line indicates a case in which n=5. In addition, in the case of n=1, the same function as the correlation function used in the conventional Expression (5) is obtained, and thus the function is shown in the graph as an example of a conventional correlation function.

A frequency (carrier frequency) of a fundamental wave exciting the detector may have a roughly determined frequency recommended by a type of the detector. Therefore, in the material tester, n in Expression (8) is preferably selected from 2 to 5 (odd harmonics from 3 to 9th order) from a range of a sampling frequency required for the type of the detector and material testing.

The correlation function used in the conventional signal processing scheme only corresponds to a single sinusoidal wave (refer to n=1 of FIG. 13). However, in signal processing of the invention, odd harmonics (refer to n=3 and n=5 of FIG. 13) are included in the correlation function. In this way, when a function including not only a component synchronous with a sinusoidal wave (carrier frequency) of a predetermined cycle but also an odd harmonic component is used as the correlation function of Expression (8), it is possible to obtain a calculation result of the resistance component $A_s$ at a short time interval than before.

In addition, according to processing of the received signal from the detector in the measurement device of the invention, it is possible to acquire a measurement result every sampling period of the sampling frequency required for material testing, and thus it is unnecessary to raise the carrier frequency in order to capture a fast change of the test piece 10 as in the past. Since the carrier frequency can be set to an appropriate frequency according to the type of the detector, even in a material tester including the displacement meter 15 having a different measuring scheme as illustrated in FIGS. 2(a) to 2(c), it is possible to acquire test data at a sampling frequency required for material testing.

REFERENCE SIGNS LIST

1 Tester body
2 Control device
10 Test piece
11 Screw rod
12 Screw rod
13 Crosshead
14 Load cell
15 Displacement meter
16 Table
21 Upper gripper
22 Lower gripper
24 Cable unit
25 Nonvolatile memory
30 Load mechanism
31 Servomotor
32 Worm reducer
33 Worm reducer
40 Control panel
41 Sensor amplifier
48 Display unit
51 DAC
52 Operational amplifier
53 Power amplifier
54 Operational amplifier
55 Power amplifier
56 Instrumentation amplifier
57 LPF
58 ADC
60 FPGA
61 Detector circuit
68 Offset subtracter
69 Gain modulator

The invention claimed is:

1. A measurement device for measuring a change in physical quantity generated in an object to be measured, the measurement device comprising:
    a detector that converts the change in physical quantity generated in the object to be measured into an electric signal and outputs the converted electric signal; and
    a sensor amplifier that applies a sinusoidal wave having a predetermined period for driving the detector to the detector and receives a signal output from the detector, wherein the sensor amplifier has a receiving circuit that extracts a component of a physical quantity measured by the detector from a received signal input from the detector to the sensor amplifier, and the receiving circuit uses, as a correlation function for extracting a resistance component converted from the physical quantity from the received signal, a function including:
    a component in synchronization with the sinusoidal wave having the predetermined period; and
    an odd harmonic component of the component in synchronization with the sinusoidal wave having the predetermined period.

2. The measurement device according to claim 1, wherein the receiving circuit extracts a resistance component As by an expression below using a function including a component in synchronization with the sinusoidal wave having the predetermined period and an odd harmonic component thereof when g(t) is set to a received signal, and $G_s(\omega)$ is set to a Fourier transform of one period in a period of a carrier wave of g(t):

[Formula 1]

$$A_s = -\frac{\omega}{\pi}\text{Im}[G_s(\omega)] = -\frac{\omega}{\pi}\sum_{k=0}^{n-1}\int_0^{\frac{2\pi}{\omega}} g(t)\,\sin(2k+1)\omega t\, dt.$$

3. A material tester for executing material testing, the material tester comprising
    a load mechanism that applies a test force to a test piece,
       wherein the material tester includes the measurement device according to claim 1.

4. The material tester according to claim 3, wherein the measurement device is a measurement device including a load cell as a detector that detects a test force applied to the test piece or a measurement device including a displacement meter as a detector that detects a displacement generated in the test piece.

5. A material tester for executing material testing, the material tester comprising
    a load mechanism that applies a test force to a test piece,
       wherein the material tester includes the measurement device according to claim 2.

\* \* \* \* \*